P. SAVOIA.
RESILIENT WHEEL.
APPLICATION FILED JAN. 17, 1910.

981,124.

Patented Jan. 10, 1911.
2 SHEETS—SHEET 1.

Witnesses
Inventor
Pietro Savoia
Atty

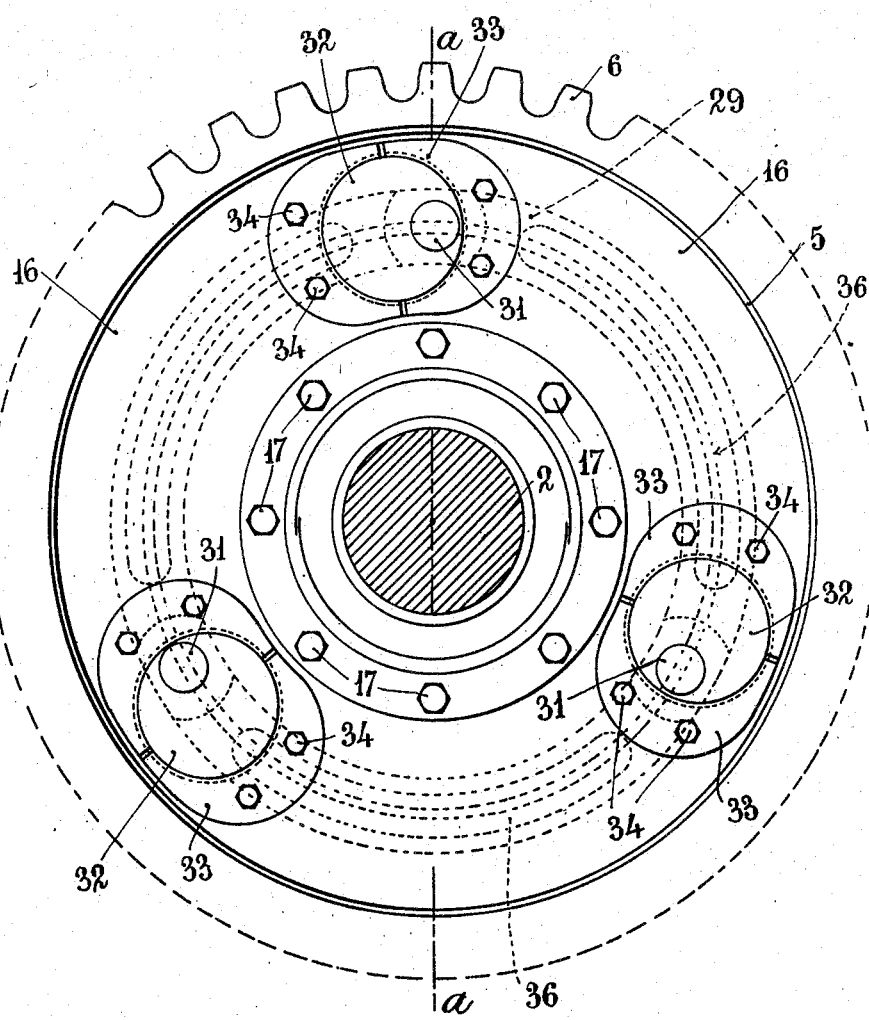

UNITED STATES PATENT OFFICE.

PIETRO SAVOIA, OF TURIN, ITALY.

RESILIENT WHEEL.

981,124.  Specification of Letters Patent.  Patented Jan. 10, 1911.

Application filed January 17, 1910. Serial No. 538,518.

*To all whom it may concern:*

Be it known that I, PIETRO SAVOIA, a subject of the King of Italy, and resident of Turin, Italy, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object to provide improvements in the resilient hubs for wheels of motor and similar road vehicles, in which on a sleeve mounted capable of rotating on the vehicle axis are mounted capable of sliding axially but not of rotating, a pair of sleeves provided with conical flanges pressed by two series of springs arranged in form of two annular rings on a double conical projection of the hub outer casing to which the wheel spokes are connected.

Figure 1:
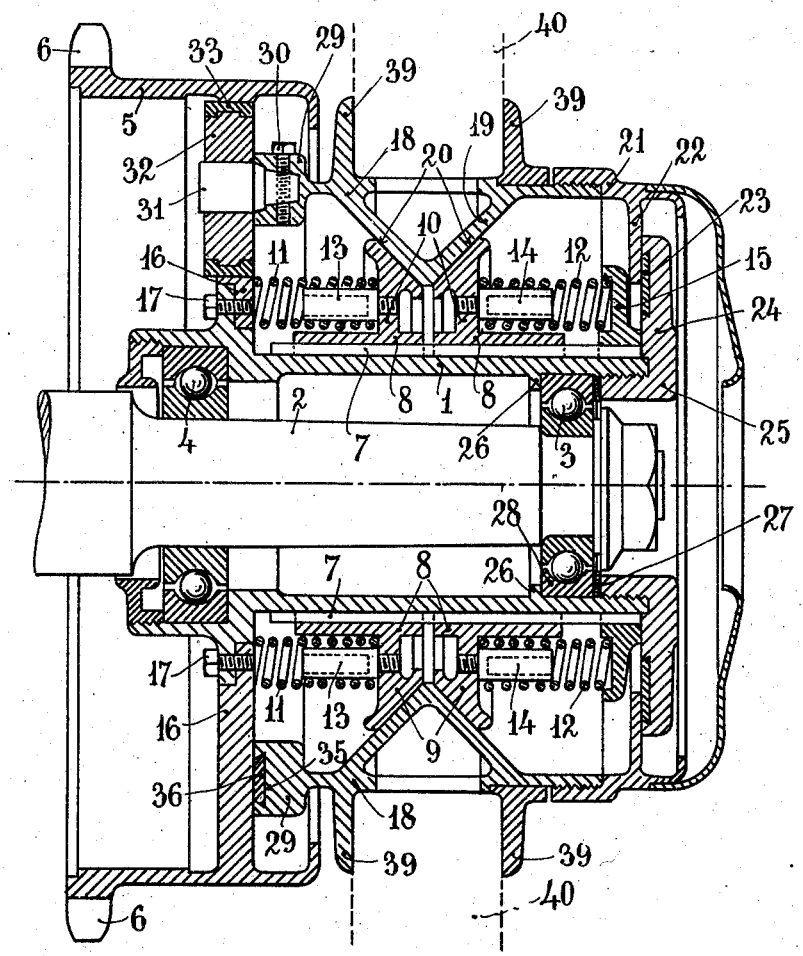
Figure 3:
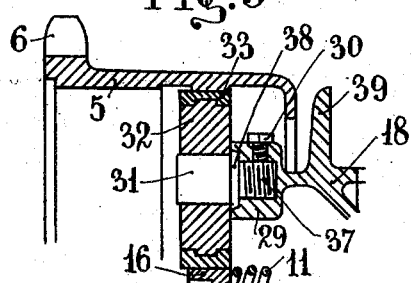

Said improvements consist substantially in the particularly advantageous form of said sliding sleeves and their conical flanges and in the form and arrangement of the springs insuring the resilience of the hub and finally in a particular swivel joint of the hub outer casing with the sleeve mounted capable of turning on the vehicle axis, so that whatever strain is transmitted to the wheel without hindering the eventual elastic deformations of the hub members. Said improved resilient hub is illustrated by way of example in the annexed drawing, in which:

Figure 1 is a vertical longitudinal section of the hub on line $a, a$ of Fig. 2, which is a rear view of same, while Fig. 3 is a detail of a modification.

Said hub is shown in connection with a chain driven driving wheel but may be applied, as it will be hereafter described, to any driving wheel driven by a universal joint and also to simply supporting wheels.

On the sleeve 1, mounted capable of rotating on the wheel axis 2 by means of the ball bearings 3, 4 and attached to the drum 5 of the strap brake, said drum being provided with the chain driven driving toothed wheel 6, are mounted capable of sliding on one or more keys 7 of the sleeve 1 two sleeves 8 provided internally with recesses receiving said keys 7. The sleeves 8 which are therefore free to slide in the direction of their axis though forced at the same time to follow the rotation of the sleeve 1, are provided with an externally conical flange 9 attached to the sleeve by means of the vertical wall 10 and are mounted opposite to each other on the sleeve 1 as shown in Fig. 1. Moreover they are pressed toward each other by means of two series of cylindrical spiral springs 11, 12 arranged opposite to each other and uniformly distributed around the sleeve 1.

The springs 11, 12 of the two series are mounted on corresponding pins 13, 14 preferably hollow for the sake of lightness, screwed in the walls 10 of the sleeves 8 and rest by their inner ends on said walls 10 of the sleeves 8 and by their outer ends the spring 12 on the ring 15 attached to the sleeve 1 and provided with corresponding recesses receiving the springs, and the spring 11 on the wall 16 of the drum 5 connected by means of screws 17 to the sleeve 1. Therefore, in order to force said sleeves 8 apart along the sleeve 1, it is necessary to overcome the pressure of the springs 11, 12.

The hub is completed by the cylindrical outer casing 18 provided internally with the annular hollow projection 19 having a double conical surface 20 corresponding to the conical surfaces of the flanges 9 of the sleeves 8, to fit between the same. Said casing 18 is provided with peripheral flanges 39 holding the wheel spokes 40 shown in dotted lines in Fig. 1.

The motion of the sleeve 1 is transmitted to the outer cylindrical casing 18 by the frictional resistance between the conical surfaces 20 of 19 and the corresponding conical surfaces of the flanges 9, and by the swivel joint between said outer casing 18 and the sleeve 1, that will be hereafter described.

The casing 18 is provided with a cover 21, the vertical flange 22 of which slides on the packing 23 of the outer disk 24 closing the hub by being screwed into the sleeve 1 by means of its inner projecting edge 25 and serving to hold the outer ring 28 of the ball bearing 3 against the inner projection of 26 of the sleeve 1 through the intermediate elastic washer 27. At its inner end the casing 18 is provided with an enlarged edge 29 to which are attached, within recesses uniformly distributed along its periphery and by means of through-screws 30, the pins 31 of corresponding eccentrics, the disks 32 of which are mounted capable of rotating within the collars 33 made in two parts fixed by means of screws 34 to the wall 16 of the drum 5. It is obvious that by this adjustment the casing 18 can first under the action of shocks assume an eccentrical position with respect to the drum 5 and therefore to the axis 2 and thereby forces the sleeves 8 apart overcoming the pressure of the springs 11, 12, so that these latter take up the shock themselves. Though the casing 18 may assume said eccentrical position, it is constantly capable of being driven through the eccentrics 32 by the drum 5; in the case of a chain driven driving wheel, as illustrated in the drawing, the strain is transmitted to the casing 18 and therefore to the vehicle wheel through the eccentrics 32 above mentioned.

It will be seen that any number of eccentrics 32 may be used; it is however preferable to use three of them, as illustrated, as thereby the possibility of dead points is avoided, and the wheel may always be caused to become eccentric whatever its position may be.

On the enlarged edge 29 and between the portions thereof bearing the pins 31 are provided grooves 35 receiving the packings 36 sliding on the wall 16 of the drum 5.

The smaller end of the pins 31, fixed in the edge 29, instead of being conical and secured by through-screws 30, as at Fig. 1, may be threaded and secured by forcing screws 30 as shown in the detailed view of Fig. 3, in which the pin 31 is also provided with a slightly conical rib 38 bearing against the disk 32. The swivel joint between the casing 18 and the sleeve 1 through the eccentrics 32 may evidently be applied not only to the hub of a chain driven wheel as illustrated in the drawing, but also to the hubs of wheels driven by a universal joint and of simply supporting wheels.

Claims—

1. In a resilient wheel, a sleeve mounted capable of rotating on the vehicle axis, two sleeves mounted by means of keys on the first sleeve and capable of sliding along the same, said sleeves being pressed toward each other by two annular series of cylindrical spiral springs and provided with opposite conical flanges;—an outer casing with an inner annular hollow projection having a double conical surface fitting between the conical flanges of the sliding sleeves; a swivel joint between said outer casing and the first sleeve constituted by a number of eccentrics, the pins of which are fixed on the rear edge of the outer casing and the disks of which are mounted movable within collars fixed on a disk attached to the first sleeve and closing the hub at its rear end.

2. In a resilient wheel, a rotatable sleeve, two sleeves axially slidable thereon, means to press the two sleeves toward each other, an outer casing having an inner annular rib conical in cross-section fitting between beveled flanges of the sliding sleeves, a plurality of eccentrics mounted in a flange on the rotatable sleeve and means connecting the eccentrics to the outer casing.

3. In a resilient wheel, a rotatable sleeve, two sleeves axially slidable thereon, means to press the two sleeves toward each other, an outer casing having an inner annular rib conical in cross section fitting between beveled flanges of the sliding sleeves, a plurality of eccentrics mounted in a flange on the rotatable sleeve and pins in said eccentrics fixed to said outer casing.

In testimony that I claim the foregoing as my invention, I have signed my name in presence of two subscribing witnesses.

PIETRO SAVOIA.

Witnesses:
 PIERO SPANOLIO,
 EUGENIO G. B. CASETTA.